United States Patent
Das et al.

(10) Patent No.: US 11,086,533 B2
(45) Date of Patent: Aug. 10, 2021

(54) METHOD AND SYSTEM FOR OPTIMIZING STORAGE SPACE IN A STORAGE UNIT

(71) Applicant: WIPRO LIMITED, Bangalore (IN)

(72) Inventors: Rishav Das, Howrah (IN); Sourav Mudi, Burdwan (IN)

(73) Assignee: Wipro Limited, Bangalore (IN)

( * ) Notice: Subject to any disclaimer, the term of this patent is extended or adjusted under 35 U.S.C. 154(b) by 402 days.

(21) Appl. No.: 16/167,857

(22) Filed: Oct. 23, 2018

(65) Prior Publication Data

US 2020/0073564 A1 Mar. 5, 2020

(30) Foreign Application Priority Data

Aug. 31, 2018 (IN) .............................. 201841032832

(51) Int. Cl.
*G06F 3/00* (2006.01)
*G06F 3/06* (2006.01)
*G06F 11/34* (2006.01)
*G06F 17/18* (2006.01)

(52) U.S. Cl.
CPC ............ *G06F 3/0626* (2013.01); *G06F 3/064* (2013.01); *G06F 3/067* (2013.01); *G06F 3/0608* (2013.01); *G06F 3/0644* (2013.01); *G06F 3/0653* (2013.01); *G06F 11/3442* (2013.01); *G06F 17/18* (2013.01)

(58) Field of Classification Search
CPC .... G06F 3/0644; G06F 3/0604; G06F 3/0608; G06F 3/064
See application file for complete search history.

(56) References Cited

U.S. PATENT DOCUMENTS

| | | |
|---|---|---|
| 5,522,045 A | 5/1996 | Sandberg |
| 6,578,129 B1 | 6/2003 | da Silva Junior et al. |
| 8,316,098 B2 | 11/2012 | Luna et al. |
| 2007/0294206 A1* | 12/2007 | Korman ................ G06F 3/0644 |
| 2010/0228928 A1* | 9/2010 | Asnaashari ......... G06F 12/0246 711/154 |
| 2016/0291876 A1* | 10/2016 | Alatorre ................ G06F 3/0644 |
| 2018/0337999 A1* | 11/2018 | Atia ...................... G06F 3/0604 |

* cited by examiner

*Primary Examiner* — Reginald G Bragdon
*Assistant Examiner* — Michael L Westbrook
(74) *Attorney, Agent, or Firm* — Finnegan, Henderson, Farabow, Garrett & Dunner, LLP

(57) ABSTRACT

Disclosed herein is method and system for managing storage space complexity in a storage unit. In an embodiment, operational parameters related to memory operations and storage parameters related to memory blocks of the storage unit are analyzed to estimate storage capacity of each of the memory blocks. Subsequently, the memory blocks are clustered into plurality of clusters based on the storage capacity. Further, one or more of the plurality of clusters are selected for performing future memory operations based on ranking of the plurality of clusters. In some embodiments, the present disclosure helps in dynamically managing storage space complexity in the storage unit and optimizes the storage space utilization. Also, the present disclosure automatically handles storage volumes, thereby reducing latency in memory backup operations and reducing amount of buffer/cache memory required.

13 Claims, 4 Drawing Sheets

US 11,086,533 B2

METHOD AND SYSTEM FOR OPTIMIZING STORAGE SPACE IN A STORAGE UNIT

TECHNICAL FIELD

The present subject matter is, in general, related to memory management and more particularly, but not exclusively, to a method and system for managing storage space complexity in a storage unit.

BACKGROUND

In enterprise database and storage environment, storage backup is an important unit for storing datasets and is useful across various domains, for example business and technology services. Existing methods for storing datasets in a storage backup unit are traditional and are often inefficient. Consequently, the existing methods require a lot of storage space to store the datasets in storage backup units.

One shortcoming of the existing methods is that different sets of Logical Unit Numbers (LUNs) are provided to every volume of the storage backup unit. That is, each backup volume is provided with different sets of LUNs irrespective of whether the backup volume is filled or partially filled. As a result, the LUNs and corresponding storage space of the storage backup unit get filled up. Consequently, data backup process consumes a large amount of storage capacity and would require additional investments into device or storage services. Also, the increased utilization of storage capacity increases storage space complexity and latency in memory operations. Additionally, existing storage backup processes cause imbalance in utilization of LUNs, thus resulting in unoptimized storage space management and limiting scalability of the storage backup units.

The information disclosed in this background of the disclosure section is only for enhancement of understanding of the general background of the invention and should not be taken as an acknowledgement or any form of suggestion that this information forms the prior art already known to a person skilled in the art.

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method for managing storage space complexity in a storage unit. The method includes measuring, by a memory management unit associated with the storage unit, values of operational parameters related to one or more memory operations on a plurality of memory blocks in the storage unit. Further, the method includes determining current values of predefined storage parameters corresponding to the plurality of memory blocks. Thereafter, the method includes estimating storage capacity of the plurality of memory blocks, for performing one or more future memory operations, based on analysis of the values of the operational parameters and the current values of the predefined storage parameters using a predetermined technique. Upon estimating the storage capacity of the plurality of memory blocks, the method includes clustering each of the plurality of memory blocks into corresponding cluster of a plurality of clusters based on the storage capacity of the plurality of memory blocks. Subsequently, the method includes ranking each of the plurality of clusters based on aggregate storage capacity of each of the plurality of clusters. Finally, the method includes selecting one or more clusters of the plurality of clusters for performing the one or more future memory operations based on the ranking of the plurality of clusters, for managing the storage space complexity in the storage unit.

Further, the present disclosure relates to a memory management unit for managing storage space complexity in a storage unit. The memory management unit includes a processor and a memory. The memory is communicatively coupled to the processor and stores processor-executable instructions, which on execution, cause the processor to measure values of operational parameters related to one or more memory operations on a plurality of memory blocks in the storage unit. Further, the instructions cause the processor to determine current values of predefined storage parameters corresponding to the plurality of memory blocks. Thereafter, the instructions cause the processor to estimate storage capacity of the plurality of memory blocks, for performing one or more future memory operations, based on analysis of the values of the operational parameters and the current values of the predefined storage parameters using a predetermined technique. Upon estimating the storage capacity of the plurality of memory blocks, the instructions cause the processor to cluster each of the plurality of memory blocks into corresponding cluster of a plurality of clusters based on the storage capacity of the plurality of memory blocks. Subsequently, the instructions cause the processor to rank each of the plurality of clusters based on aggregate storage capacity of each of the plurality of clusters. Finally, the instructions cause the processor to select one or more clusters of the plurality of clusters to perform the one or more future memory operations, based on the ranking of the plurality of clusters, to manage the storage space complexity in the storage unit.

Furthermore, the present disclosure relates to a non-transitory computer-readable medium including instructions stored thereon that when processed by at least one processor cause a memory management unit associated with a storage unit to perform operation comprising measuring values of operational parameters related to one or more memory operations on a plurality of memory blocks in the storage unit. Further, the instructions cause the memory management unit to determine current values of predefined storage parameters corresponding to the plurality of memory blocks. Subsequently, the instructions cause the memory management unit to estimate storage capacity of the plurality of memory blocks for performing one or more future memory operations, based on analysis of the values of the operational parameters and the current values of the predefined storage parameters using a predetermined technique. Thereafter, the instructions cause the memory management unit to cluster each of the plurality of memory blocks into corresponding cluster of a plurality of clusters based on the storage capacity of the plurality of memory blocks. Further, the instructions cause the memory management unit to rank each of the plurality of clusters based on aggregate storage capacity of each of the plurality of clusters. Finally, the instructions cause the memory management unit to select one or more clusters of the plurality of clusters for performing the one or more future memory operations based on the ranking of the plurality of clusters, for managing the storage space complexity in the storage unit.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
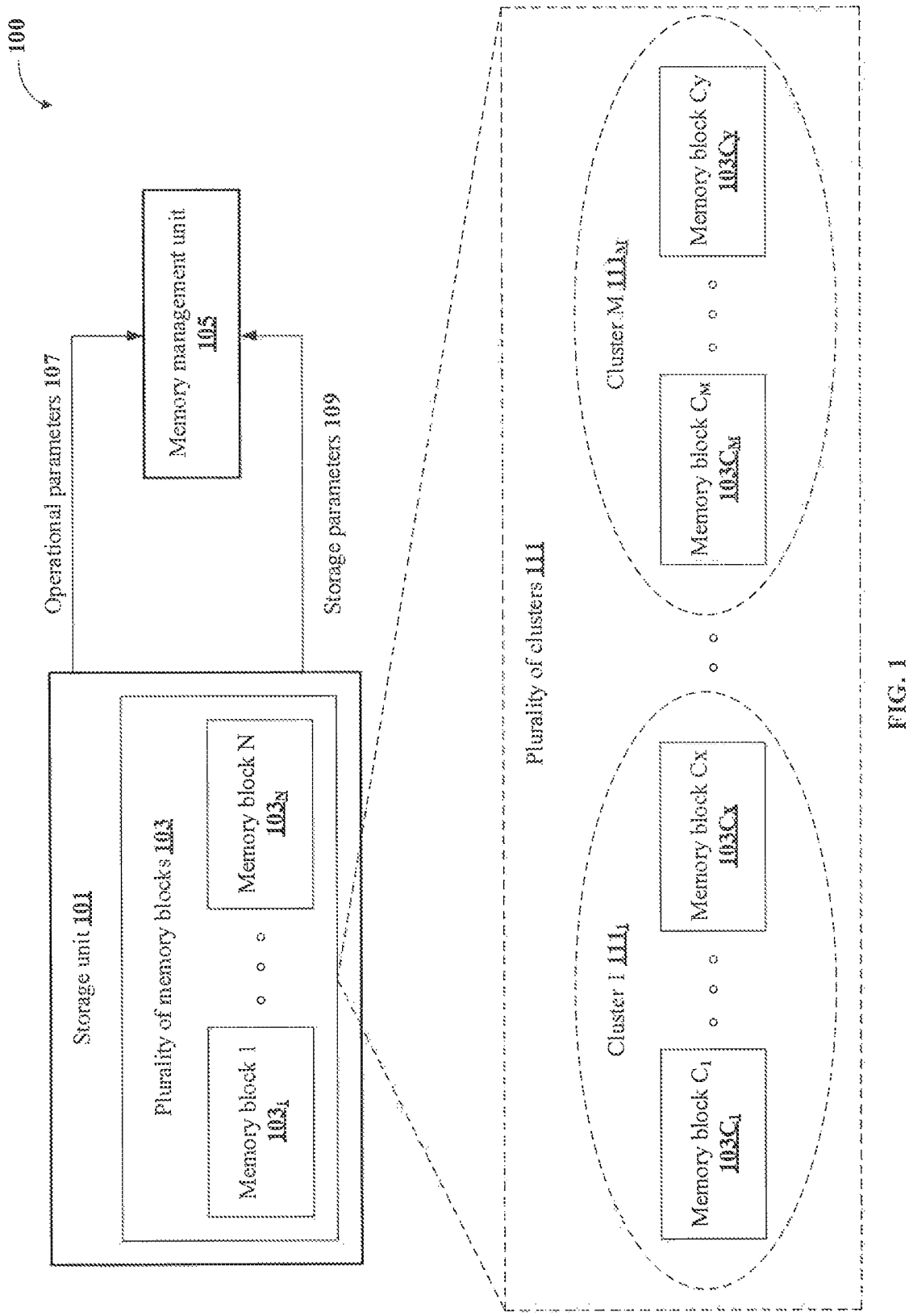
FIG. 1 illustrates an exemplary environment for managing storage space complexity in a storage unit in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

A Logical Unit Number (LUN) is a unique identifier for a physical storage allocation. The LUN may be used to reference an entire memory region, a single hard disk or a partition of the memory region, or multiple disks or partitions of the memory region. A virtual LUN is representation of a storage area that is not associated with any of the physical storage allocation or hard disks. More often, virtual LUNs are used in thin provisioning and/or virtual provisioning of storage area during management of Storage Area Network (SAN) in the storage region.

However, the thin provisioning of LUNs results in various problems as mentioned below:

Firstly, there may be a performance degradation hit, chances of which increases with increase in number of memory snapshots. The number of memory snapshots may increase with increase in number of files or datasets pending for allocation. Thus, allocating data to the memory region may take longer time since data lookup may have to traverse multiple files or datasets.

Secondly, when the storage area is over provisioned, meaning that the total virtual size is greater than the available storage, the hypervisor may need to carefully monitor actual usage of the storage. Also, the hyper visor may have to set right threshold to identify a situation where system is running out of storage space. When this situation arises, the system may halt or fail, depending on implementation.

Another major problem is in managing the whole storage infrastructure on demand in an optimized manner. This may also require human intervention of expert administrators of different levels to solve arising problems.

In view of the aforesaid problems, the present disclosure provides a mechanism for dynamically managing storage space complexity in a storage unit using machine learning techniques. In an embodiment, the method of present uses real-time values of various operational parameters and storage parameters related to the storage unit to train an Artificial Intelligence (AI) based technique. Later, the trained AI technique may be used to estimate storage capacity of memory blocks in the storage unit. Subsequently, the memory blocks may be grouped into various clusters based on the estimated storage capacity. Thereafter, the clusters of memory blocks may be ranked based on an aggregate storage capacity of the memory blocks. Finally, one of the clusters of the memory blocks may be selected for future memory operations to be performed on the storage unit based on the ranking of the clusters of memory blocks.

Thus, the present disclosure helps in understanding which set of memory blocks are already used, and which set of memory blocks need to be provisioned. Also, the present disclosure helps in managing the storage volumes, LUNs, backup data blocks, shared memory regions of application/end user. Further, the present disclosure provides a method for automatically handling storage volumes, thereby reducing latency in memory backup operations and reducing amount of buffer/cache memory required.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment for managing storage space complexity in a storage unit 101 in accordance with some embodiments of the present disclosure.

In some implementations, the environment 100 may include a storage unit 101 and a memory management unit 105. As an example, the storage unit 101 may be a physical storage such as a Solid-State Drive (SSD), a Network Attached Storage (NAS), an Optical Drive, a cloud storage or an external Hard Disk Drive (HDD). Further, the storage unit 101 may also include an internal memory of a computing system such as Read-Only Memory (ROM), flash memory or Random-Access Memory (RAM). In some implementations, the storage unit 101 may include a plurality of memory blocks 103, namely memory block 1 $103_1$ to memory block N $103_N$. In an embodiment, the plurality of memory blocks 103 may be equivalent to Logical Unit Numbers (LUNs) of the storage unit 101. That is, the plurality of memory blocks 103 may be smallest units of storage space within the storage unit 101.

In some implementations, the memory management unit 105 may be any computing system, which may be configured for managing storage space complexity of the storage unit 101 in accordance with various embodiments of the present disclosure. In an embodiment, the memory management unit 105 may be configured as a part of a storage controller associated with the storage unit 101. Alternatively, the memory management unit 105 may be configured external to the storage unit 101, and communicatively associated with the storage unit 101.

In an embodiment, the memory management unit 105 may measure values of operational parameters 107 related to one or more memory operations on the plurality of memory blocks 103 in the storage unit 101. As an example, the operational parameters 107 measured from the plurality of memory blocks 103 may include, without limiting to, at least one of Input/Output Per Second (IOPS) transaction rate, jitter rate, IOPS deduplication rate, IOPS compression rate, and memory block propagation rate associated with the one or more memory operations on the plurality of memory blocks 103. In an embodiment, the one or more memory operations may include, without limiting to, at least one of memory-write operations and memory-write operations. That is, the memory management unit 105 may measure the one or more operational parameters 107 while performing the memory-write operations or the memory-read operations on the plurality of memory blocks 103.

In an embodiment, in addition to measuring the operational parameters 107, the memory management unit 105 may determine current values of predefined storage parameters 109 corresponding to the plurality of memory blocks 103. The predefined storage parameters 109 may include, without limiting to, at least one of number of unfilled memory blocks, number of moderately filled memory blocks, number of filled memory blocks and memory provisioning status of each of the plurality of memory blocks 103.

In an embodiment, after measuring the operational parameters 107 and determining current values of the storage parameters 109, the memory management unit 105 may estimate storage capacity of the plurality of memory blocks 103. Here, the storage capacity of the plurality of memory blocks 103 may refer to amount of storage space available in the plurality of memory blocks 103 for performing one or more future memory operations. In an embodiment, the storage capacity may be estimated based on analysis of the values of the operational parameters 107 and the current values of the predefined storage parameters 109 using a predetermined technique. As an example, the predetermined technique may include a multiple linear regression analysis technique.

In an embodiment, upon estimating the storage capacity of the plurality of memory blocks 103, the memory management unit 105 may cluster each of the plurality of memory blocks 103 into corresponding cluster of a plurality of clusters 111, namely cluster 1 $111_1$ to cluster M $111_M$ as shown in FIG. 1. For example, as shown in FIG. 1, the cluster 1 $111_1$ may include a plurality of memory blocks $103C_1$ to memory block 103Cx. Similarly, the cluster M $111_M$ may include a plurality of memory blocks $103C_M$ to memory block 103Cy. In an embodiment, clustering of the plurality of memory blocks 103 may be based on the storage capacity of the plurality of memory blocks 103. As an example, one or more memory blocks of the plurality of memory blocks 103, which are moderately filled may be clustered into a single cluster. Similarly, the one or more memory blocks of the plurality of memory blocks 103, which are unfilled may be clustered into a different cluster. Thus, upon completion of the clustering process, each cluster of the plurality of clusters 111 may include plurality of memory blocks 103 with similar storage capacity.

In an embodiment, upon clustering each of the plurality of memory blocks 103 into corresponding cluster of the plurality of clusters 111, the memory management unit 105 may rank each of the plurality of clusters 111. The ranking of the plurality of clusters 111 may be based on an aggregate storage capacity of each of the plurality of clusters 111. As an example, the aggregate storage capacity of a cluster 'C' may be calculated as sum of the storage capacity of each of the one or more memory blocks clustered within the cluster 'C'. In an embodiment, the cluster having maximum aggregate storage capacity may be assigned with a highest rank.

In an embodiment, after ranking the plurality of clusters 111, the memory management unit 105 may select one or more clusters of the plurality of clusters 111 for performing the one or more future memory operations based on the ranking of the plurality of clusters 111. As an example, the cluster having highest rank, that is, the cluster with maximum storage capacity may be selected for performing the one or more future memory operations. Alternatively, the cluster whose storage capacity matches with storage requirement of the one or more future memory operations may be selected performing the one or more future memory operations. Thus, the memory management unit 105 selects an optimal cluster among the plurality of clusters 111 for performing the one or more future operations, thereby managing the storage space complexity in the storage unit 101.

Figure 2:
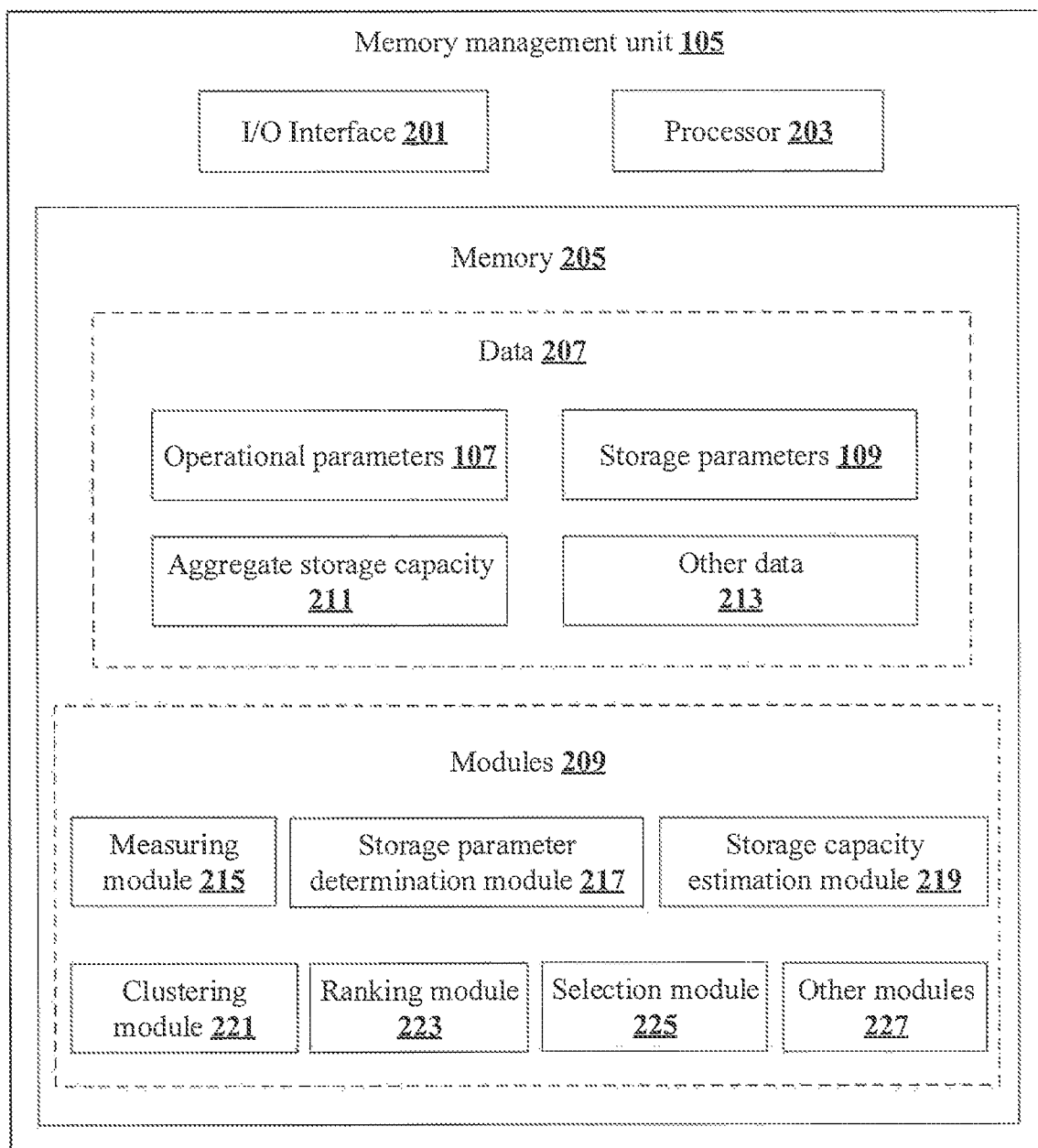
FIG. 2 shows a detailed block diagram illustrating a memory management unit in accordance with some embodiments of the present disclosure.

FIG. 2 shows a detailed block diagram illustrating the memory management unit 105 in accordance with some embodiments of the present disclosure.

In some implementations, the memory management unit 105 may include an I/O interface 201, a processor 203, and a memory 205. The I/O interface 201 may be configured to communicate with a storage unit 101 associated with the memory management unit 105. The memory 205 may be communicatively coupled to the processor 203 and may store data 207 and one or more modules 209. The processor 203 may be configured to perform one or more functions of the memory management unit 105 for managing storage space complexity in the storage unit 101, using the data 207 and the one or more modules 209.

In an embodiment, the processor 203 and the memory 205 may be a part of storage controller or any computation unit associated with the storage unit 101. Further, various hardware chips such as Redundant Array of independent Disks (RAID) controller cards, Serial Attached Small Computer System Interface (SCSI) or SAS cards and targets ports of the storage unit 101 may be integrated and operated through the processor 203. Additionally, information like temperature of the storage unit 101, mother board sensors information, cooling system information and Light Emitting Diode (LED) sequencing information may be stored in the memory 205 and managed by the processor 203 according to a current set of operations performed on the storage unit 101.

In an embodiment, the data 207 may include, without limitation, values of operational parameters 107, values of storage parameters 109, an aggregate storage capacity 211 and other data 213. In some implementations, the data 207 may be stored within the memory 205 in the form of various data structures. Additionally, the data 207 may be organized using data models, such as relational or hierarchical data models. The other data 213 may store various temporary data and files generated by one or more modules 209 while performing various functions of the memory management unit 105. As an example; the other data 213 may include an estimated storage capacity of plurality memory blocks, rank assigned to each of plurality of clusters 111 and the like.

In an embodiment, the operational parameters 107 may be related to one or more memory operations on a plurality of memory blocks 103 in the storage unit 101. The one or more memory operations may include at least one of memory-write operations and memory-read operations. As an example, the operational parameters 107 may include, without limiting to, at least one of an Input/Output Per Second (IOPS) transaction rate, jitter rate, IOPS deduplication rate, IOPS compression rate, and memory block propagation rate associated with the one or more memory operations. For instance, the IOPS transaction rate may indicate total number of Input/Output memory operations performed on the storage unit 101 in one second. In other words, the IOPS transaction rate may be used for estimating the performance or operational speed of the storage unit 101. The jitter rate may indicate extent of delay occurred while performing consecutive memory operations on the storage unit 101. The IOPS deduplication and compression rate may indicate the rate at which deduplication and compression of the datasets is performed in the storage unit 101. The memory block propagation rate may indicate the rate at which new memory blocks are propagated within the storage unit 101. In an embodiment, analysis of the operational parameters 107 helps in determining current usage pattern of the storage unit 101.

In an embodiment, the storage parameters 109 may be corresponding to the plurality of memory blocks 103 in the storage unit 101. As an example, the predefined storage parameters 109 may include, without limiting to, at least one of number of unfilled memory blocks, number of moderately filled memory blocks, number of filled memory blocks and memory provisioning status of each of the plurality of memory blocks 103. For instance, the memory provisioning status of the memory blocks may indicate whether the memory block is currently being used for performing a memory operation in the storage unit 101.

In an embodiment, the aggregate storage capacity 211 of the plurality of clusters 111 may be equal to sum of the storage capacity of each of the one or more memory blocks in corresponding cluster of the plurality of clusters 111. Suppose, a cluster 'C1' has 'N' memory blocks—memory block $C1_1$ to memory block $C1_N$, then the aggregate storage capacity 211 of the plurality of clusters 111 may be calculated as indicated in Equation (1) below:

$$\text{Aggregate storage capacity of cluster } C1 = \sum_{k=1}^{N} (\text{Storage capacity of } C1_k) \qquad (1)$$

Wherein,

'$C1_k$' is the storage capacity of '$k^{th}$' memory block in the cluster C1.

In an embodiment, the aggregate storage capacity 211 of the plurality of clusters 111 may be used for determining the amount of storage space available on each of the plurality of clusters 111.

In an embodiment, each of the data 207 may be processed by the one or more modules 209. In some implementations, the one or more modules 209 may be communicatively coupled to the processor 203 for performing one or more functions 103 of the memory management unit 105. In an implementation, the one or more modules 209 may include, without limiting to, a measuring module 215, a storage parameter determination module 217, a storage capacity estimation module 219, a clustering module 221, a ranking module 223, a selection module 225 and other modules 227.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In an embodiment, the other modules 227 may be used to perform various miscellaneous functionalities of the memory management unit 105. It will be appreciated that such one or more modules 209 may be represented as a single module or a combination of different modules.

In an embodiment, the measuring module 215 may be configured for measuring values of operational parameters 107 related to one or more memory operations on the plurality of memory blocks 103 in the storage unit 101. In an implementation, the measuring module 215 may measure the values of the operational parameters 107 upon completion of a memory-write and/or memory-read operation on the storage unit 101. That is, the measuring module 215 may be used for determining a current state and pattern of memory usage on the storage unit 101 based on the values of the operational parameters 107.

In an embodiment, the storage parameter determination module 217 may be configured for determining current values of the predefined storage parameters 109 corresponding to the plurality of memory blocks 103. As an example, the predefined storage parameters 109 may include, without limiting to, at least one of number of unfilled memory blocks, number of moderately filled memory blocks, number of filled memory blocks and memory provisioning status of each of the plurality of memory blocks 103. Thus, the storage parameter determination module 217 helps in determining change in memory usage of the plurality of memory blocks 103 in real-time. The current values of predefined storage parameters 109 may be further used to determine what portion of the storage unit 101 is filled and/or is available for future memory operations.

In an embodiment, storage capacity estimation module 219 may be configured for estimating the storage capacity of the plurality of memory blocks 103 for performing one or more future memory operations. The storage capacity estimation module 219 may estimate the storage capacity based on analysis of the values of the operational parameters 107 and the current values of the predefined storage parameters 109. In an implementation, the analysis of the values of the operational parameters 107 and the predefined storage parameters 109 may be performed using a predetermined technique configured in the storage capacity estimation module 219. As an example, the predetermined technique may be multiple linear regression analysis technique. The multiple linear regression analysis technique is a machine learning technique, which may be used for modelling relationship between two or more known variables by fitting a linear equation to observed datasets. The linear equation model which may be used for the multiple linear regression analysis may be as indicated in Equation (2) below:

$$y=\text{alpha}+\text{beta}(X_1, X_2, X_3, X_4 \ldots X_n) \qquad (2)$$

Wherein,

'y' is value of a parameter 'Xi' (i=1, 2, . . . , n) to be predicted. Here, value of '$X_i$' may correspond to value of any of the operational parameters 107 and the storage parameters 109 such as time required to fill a memory block, number of filled memory blocks and the like.

'$X_i$' may be a variable which corresponds to any of the operational parameters 107 and the storage parameters 109 determined in the previous stages.

In an embodiment, measured value of the variable 'X' may be substituted and slope (as 'beta') and intercept (as 'alpha') of the linear equation model may be calculated using equation (2). Subsequently, value of the 'y' parameter may be estimated by multiplying the 'beta' value with each of the input variables 'X' and summing up the multiplied value with 'alpha' value. In an embodiment, the above estimation process may be iteratively performed for each value of the 'X' variable for estimating corresponding future values of the 'X' variables.

In an embodiment, the clustering module 221 may be configured for clustering each of the plurality of memory blocks 103 into corresponding cluster of the plurality of clusters 111 based on the storage capacity of the plurality of memory blocks 103. The clustering module 221 may align each of the plurality of memory blocks 103 based on estimated storage capacity of the plurality of memory blocks 103 and group the memory blocks into plurality of clusters 111 including filled memory blocks, unfilled memory blocks and moderately filled memory blocks.

In an embodiment, the ranking module 223 may be configured for ranking each of the plurality of clusters 111 based on the aggregate storage capacity 211 of each of the plurality of clusters 111. As an example, the aggregate storage capacity 211 of each of the plurality of clusters 111 may be calculated using the Equation (1). In an embodiment, the ranking assigned to each of the plurality of clusters 111 may be directly proportional to the aggregate storage capacity 211 of the plurality of clusters 111. That is, one or more clusters of the plurality of clusters 111 having maximum aggregate storage capacity 211 may be assigned a higher rank than the one or more clusters having lesser aggregate storage capacity 211. In other words, the ranking of each of the plurality of clusters 111 may be indicative of the amount of storage space available in the plurality of clusters 111 for performing one or more future memory operations.

In an embodiment, the selection module 5 may be configured for selecting one or more clusters of the plurality of clusters 111 for performing the one or more future memory operations based on the ranking of the plurality of clusters 111. In an implementation, the selection module 225 may select the one or more clusters according to the IOPS type and requirement of the one or more future memory operations. For example, the set of memory operations which would require a larger amount storage space may be provided a highest ranked cluster, that is, a cluster having maximum aggregate storage capacity 211. Similarly, the set of memory operation which would require comparatively a lesser storage space may be provided a lesser ranked cluster, thereby optimally meeting the storage requirements of incoming memory operations.

Thus, in summary, the memory management unit 105 may cluster the memory blocks based on their storage capacity and utilize thin provisioning to virtually extend the unfilled space of a cluster to a filled cluster for performing the one or more future memory operations. Additionally, the memory management unit 105 may facilitate extending the unfilled space of the clusters during replication and migration of datasets across the storage unit 101.

Exemplary Scenario:

Consider a real-time memory allocation process, in which different memory blocks are assigned to different applications running on a system in order to manage the applications and related data in a standard manner. Typically, the memory allocation process includes clustering the memory blocks to form Consistency Groups (CGs). The CGs help in understanding which specific memory blocks are used and which memory blocks need to be provisioned.

In the above scenario, the memory management unit 105 may be configured to gather and manage information related to each of the memory blocks and the CGs. Subsequently, the collected information may be used for creating a plurality of memory clusters comprising a plurality of memory blocks. Further, information related to each of the memory clusters, which is in the form of memory snapshots, may be analyzed for identifying free memory blocks within each of the memory clusters. Thereafter, based on analysis of the memory snapshots, the memory management unit 105 may rank each of the memory clusters according to amount of free space available on each of the memory clusters. Finally, a memory cluster for performing future memory operations may be selected according to ranking of the memory clusters and memory requirements of the future memory operations.

Figure 3:
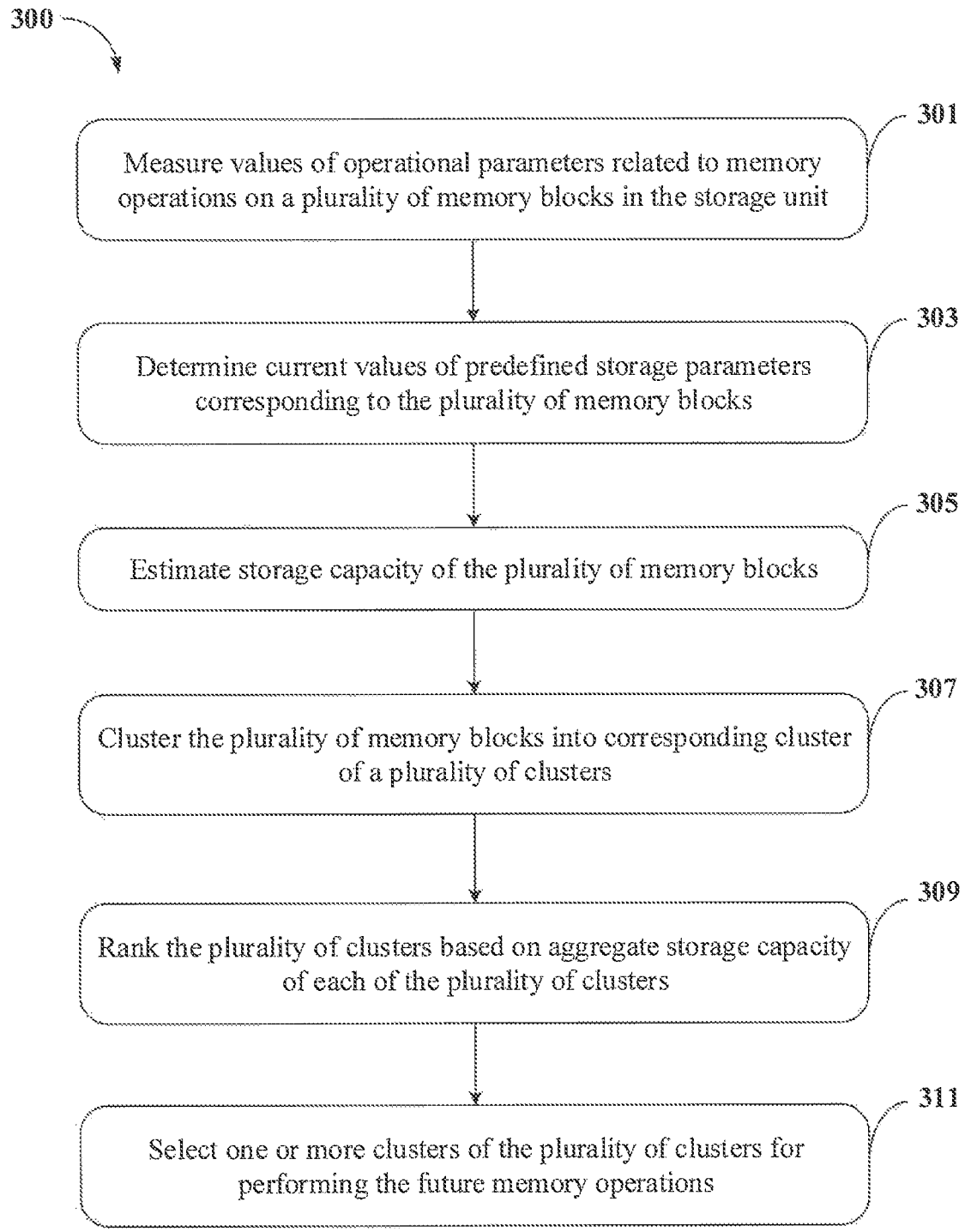
FIG. 3 shows a flowchart illustrating a method of managing storage space complexity in a storage unit in accordance with some embodiments of the present disclosure.

FIG. 3 shows a flowchart illustrating a method of managing storage space complexity in a storage unit 101 in accordance with some embodiments of the present disclosure.

As illustrated in FIG. 3, the method 300 may include one or more blocks illustrating a method of managing the storage space complexity in the storage unit 101 using the memory management unit 105 shown in FIG. 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 includes measuring, by the memory management unit 105, values of operational parameters 107 related to one or more memory operations on a plurality of memory blocks 103 in the storage unit 101. In an embodiment, the one or more memory operations may include at least one of memory-write operations and memory-read operations. Further, the operational parameters 107 may include, without limiting to, at least one of Input/Output Per Second (IOPS) transaction rate, jitter rate, IOPS deduplication rate, IOPS compression rate, and memory block propagation rate associated with the one or more memory operations. In an implementation, the memory management unit 105 may be associated with the storage unit 101.

At block 303, the method 300 includes determining, by the memory management unit 105, current values of predefined storage parameters 109 corresponding to the plurality of memory blocks 103. As an example, the predefined storage parameters 109 may include, without limiting to, at least one of number of unfilled memory blocks, number of moderately filled memory blocks, number of filled memory blocks and memory provisioning status of each of the plurality of memory blocks 103.

At block 305, the method 300 includes estimating, by the memory management unit 105, storage capacity of the plurality of memory blocks 103, for performing one or more future memory operations. In an embodiment, the storage capacity may be estimated based on analysis of the values of the operational parameters 107 and the current values of the predefined storage parameters 109 using a predetermined technique. As an example, the predetermined technique may be multiple linear regression analysis technique.

At block 307, the method 300 includes clustering, by the memory management unit 105, each of the plurality of memory blocks 103 into corresponding cluster of a plurality of clusters 111 based on the storage capacity of the plurality of memory blocks 103.

At block 309, the method 300 includes ranking, by the memory management unit 105, each of the plurality of clusters 111 based on aggregate storage capacity 211 of each of the plurality of clusters 111. In an embodiment, the aggregate storage capacity 211 of each of the plurality of clusters 111 may be computed as sum of the storage capacity of each of the plurality of memory blocks 103 in the corresponding cluster of the plurality of clusters 111.

At block 311, the method 300 includes selecting, by the memory management unit 105, one or more clusters of the plurality of clusters 111 for performing the one or more future memory operations based on the ranking of the plurality of clusters 111, thereby managing the storage space complexity in the storage unit 101. In an embodiment, selecting the one or more clusters of the plurality of clusters 111 for performing the one or more future memory operations may include selecting the one or more clusters of the plurality of clusters 111 including at least one of unfilled memory blocks and moderately filled memory blocks.

Computer System

Figure 4:
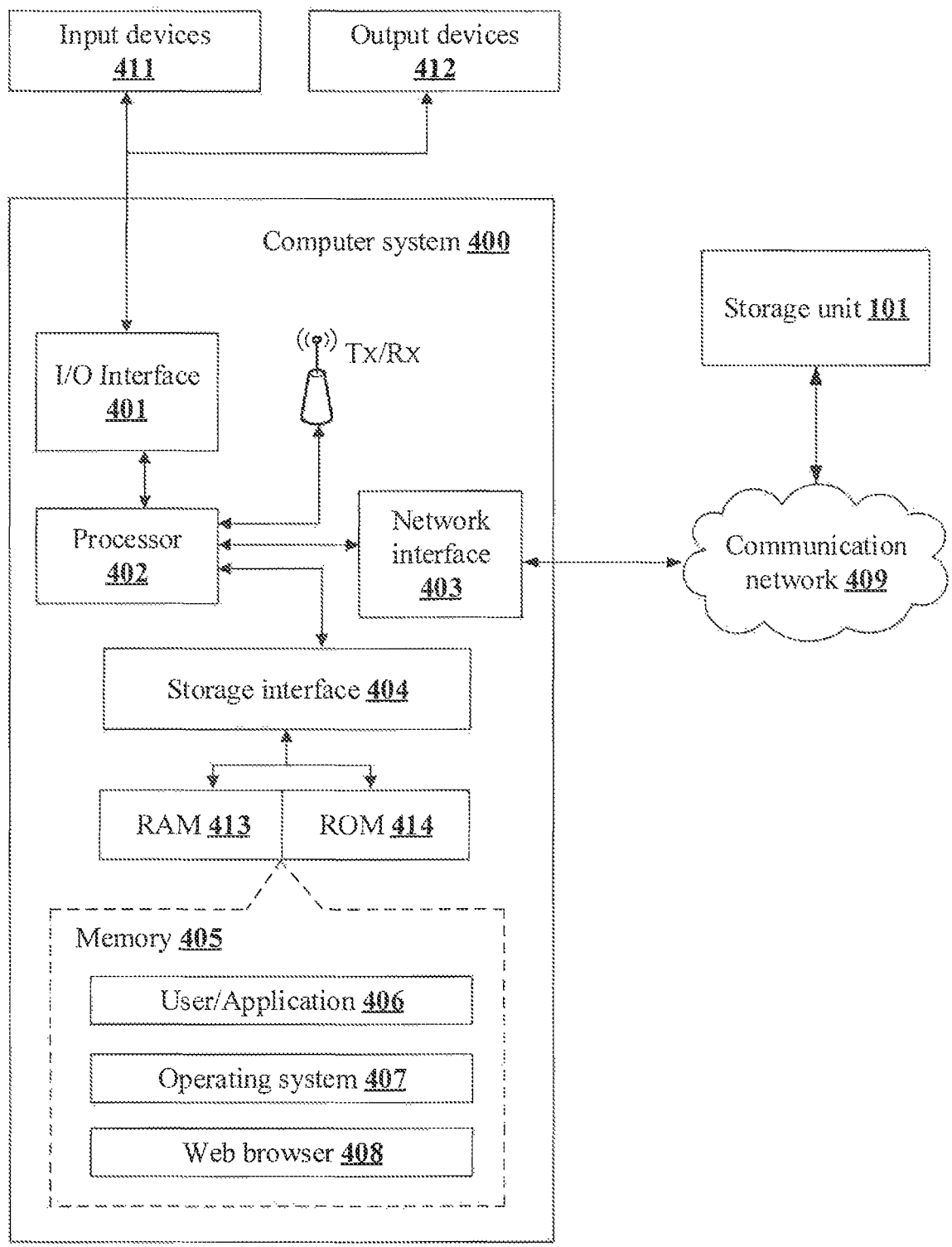
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be memory management unit 105 shown in FIG. 1, which may be used for managing storage space complexity in a storage unit 101. The computer system 400 may include a central processing unit ("CPU" or "processor") 402. The processor 402 may comprise at least one data processor for executing program components for executing user- or system-generated business processes. A user may include a person, a user in the environment 100, or any system/sub-system being operated parallelly to the computer system 400. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In some embodiments, the processor 402 may be disposed in communication with a communication network. 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 403 and the communication network 409, the computer system 400 may receive values of operational parameters 107 related to one or more memory operations on a plurality of memory blocks 103 (not shown in FIG. 4) in the storage unit 101. Further, the communication network 409 may be used for receiving current values of predefined storage parameters 109 corresponding to the plurality of memory blocks 103 in the storage unit 101.

In an implementation, the communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application interface 406, an operating system 407, a web browser 408, and the like. In some embodiments, computer system 400 may store user/application data 406, such as the data, variables, records, etc. as described in this invention. Such databases may be implemented as fault-tolerant relational, scalable, secure databases such as Oracle® or Sybase®.

The operating system 407 may facilitate resource management and operation of the computer system 400.

Examples of operating systems include, without limitation, APPLE® MACINTOSH® OS X®, UNIX®, UNIX-like system distributions (E.G., BERKELEY SOFTWARE. DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 406 may facilitate display, execution, interaction, manipulation, or operation of program components through textual or graphical facilities. For example, the user interface 406 may provide computer interaction interface elements on a display system operatively connected to the computer system 400, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 408 may be a hypertext viewing application. Secure web browsing may be provided using Secure Hypertext Transport Protocol (HTTPS), Secure Sockets Layer (SSL), Transport Layer Security (TLS), and the like. The web browsers 408 may utilize facilities such as AJAX, DHTML, ADOBE® FLASH®, JAVASCRIPT®, JAVA®, Application Programming Interfaces (APIs), and the like. Further, the computer system 400 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the method of present disclosure dynamically manages storage space complexity in a storage unit and optimizes the storage space utilization.

In an embodiment, the method of present disclosure automatically handles storage volumes, thereby reducing latency in memory backup operations and reducing amount of buffer/cache memory required.

In an embodiment, the method of present disclosure helps in creating multiple Logical Unit Numbers (LUNs) within less amount of storage volumes and ensures effective management of snapshot service without human intervention.

In case of thin provisioning of LUNs, the method of present disclosure helps in migrating and replicating the LUNs without converting them to thick LUNs, thereby ensuring easy monitoring of LUNs, storage volumes and consistency groups without human intervention.

In an embodiment, the method of present disclosure may be used to effectively manage the snapshots, thereby providing protection from overflow of more space in virtual disk over physical disk space.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Reference Number | Description |
|---|---|
| 100 | Environment |
| 101 | Storage unit |
| 103 | Plurality of memory blocks |
| 105 | Memory management unit |
| 107 | Operational parameters |
| 109 | Storage parameters |
| 111 | Plurality of clusters |
| 201 | I/O interface |
| 203 | Processor |
| 205 | Memory |
| 207 | Data |
| 209 | Modules |
| 211 | Aggregate storage capacity |
| 213 | Other data |
| 215 | Measuring module |
| 217 | Storage parameter determination module |
| 219 | Storage capacity estimation module |
| 221 | Clustering module |
| 223 | Ranking module |
| 225 | Selection module |
| 227 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |

What is claimed is:

1. A method of managing storage space complexity in a storage unit, the method comprising:
   measuring, by a memory management unit associated with the storage unit, values of operational parameters related to one or more memory operations on a plurality of memory blocks in the storage unit;
   determining, by the memory management unit, current values of predefined storage parameters corresponding to the plurality of memory blocks;
   estimating, by the memory management unit, storage capacity of the plurality of memory blocks, for performing one or more future memory operations, based on analysis of the values of the operational parameters and the current values of the predefined storage parameters using a predetermined technique, wherein the predetermined technique comprises a multiple linear regression analysis technique;
   clustering, by the memory management unit, each of the plurality of memory blocks into corresponding cluster of a plurality of clusters based on the storage capacity of the plurality of memory blocks;
   ranking, by the memory management unit, each of the plurality of clusters based on aggregate storage capacity of each of the plurality of clusters; and
   selecting, by the memory management unit, one or more clusters of the plurality of clusters for performing the one or more future memory operations based on the ranking of the plurality of clusters, for managing the storage space complexity in the storage unit.

2. The method as claimed in claim 1, wherein the one or more memory operations comprise at least one of memory-write operations and memory-read operations.

3. The method as claimed in claim 1, wherein the operational parameters comprise at least one of Input/Output Per Second (IOPS) transaction rate, jitter rate, IOPS deduplication rate, IOPS compression rate, and memory block propagation rate associated with the one or more memory operations.

4. The method as claimed in claim 1, wherein the predefined storage parameters comprise at least one of number of unfilled memory blocks, number of moderately filled memory blocks, number of filled memory blocks and memory provisioning status of each of the plurality of memory blocks.

5. The method as claimed in claim 1, wherein the aggregate storage capacity of each of the plurality of clusters is computed as sum of the storage capacity of each of the plurality of memory blocks in the corresponding cluster of the plurality of clusters.

6. The method as claimed in claim 1, wherein selecting the one or more clusters of the plurality of clusters for performing the one or more future memory operations comprises selecting the one or more clusters of the plurality of clusters comprising at least one of unfilled memory blocks and moderately filled memory blocks.

7. A memory management unit for managing storage space complexity in a storage unit, the memory management unit comprising:
   a processor; and
   a memory, communicatively coupled to the processor, wherein the memory stores processor-executable instructions, which on execution, cause the processor to:
   measure values of operational parameters related to one or more memory operations on a plurality of memory blocks in the storage unit;
   determine current values of predefined storage parameters corresponding to the plurality of memory blocks;
   estimate storage capacity of the plurality of memory blocks, for performing one or more future memory operations, based on analysis of the values of the operational parameters and the current values of the predefined storage parameters using a predetermined technique, wherein the predetermined technique comprises a multiple linear regression analysis technique;
   cluster each of the plurality of memory blocks into corresponding cluster of a plurality of clusters based on the storage capacity of the plurality of memory blocks;
   rank each of the plurality of clusters based on aggregate storage capacity of each of the plurality of clusters; and
   select one or more clusters of the plurality of clusters to perform the one or more future memory operations, based on the ranking of the plurality of clusters, to manage the storage space complexity in the storage unit.

8. The memory management unit as claimed in claim 7, wherein the one or more memory operations comprise at least one of memory-write operations and memory-read operations.

9. The memory management unit as claimed in claim 7, wherein the operational parameters comprise at least one of Input/Output Per Second (IOPS) transaction rate, jitter rate, IOPS deduplication rate, IOPS compression rate, and memory block propagation rate associated with the one or more memory operations.

10. The memory management unit as claimed in claim 7, wherein the predefined storage parameters comprise at least one of number of unfilled memory blocks, number of moderately filled memory blocks, number of filled memory blocks and memory provisioning status of each of the plurality of memory blocks.

11. The memory management unit as claimed in claim 7, wherein the processor computes the aggregate storage capacity of each of the plurality of clusters as sum of the storage capacity of each of the plurality of memory blocks in the corresponding cluster of the plurality of clusters.

12. The memory management unit as claimed in claim 7, wherein the processor selects the one or more clusters of the plurality of clusters comprising at least one of unfilled memory blocks and moderately filled memory blocks as selection of the one or more clusters of the plurality of clusters for performing the one or more future memory operations.

13. A non-transitory computer-readable medium including instructions stored thereon that when processed by at least one processor cause a memory management unit associated with a storage unit to perform operation comprising:

measuring values of operational parameters related to one or more memory operations on a plurality of memory blocks in the storage unit;

determining current values of predefined storage parameters corresponding to the plurality of memory blocks;

estimating storage capacity of the plurality of memory blocks, for performing one or more future memory operations, based on analysis of the values of the operational parameters and the current values of the predefined storage parameters using a predetermined technique, wherein the predetermined technique comprises a multiple linear regression analysis technique;

clustering each of the plurality of memory blocks into corresponding cluster of a plurality of clusters based on the storage capacity of the plurality of memory blocks;

ranking each of the plurality of clusters based on aggregate storage capacity of each of the plurality of clusters; and selecting one or more clusters of the plurality of clusters for performing the one or more future memory operations based on the ranking of the plurality of clusters, for managing the storage space complexity in the storage unit.

\* \* \* \* \*